Aug. 25, 1970

K. C. ALLISON 3,525,827

PRINTED CIRCUIT ROTARY SWITCH

Filed May 5, 1969

Inventor
Kenneth C. Allison
By Stanley Hoods
Attorney

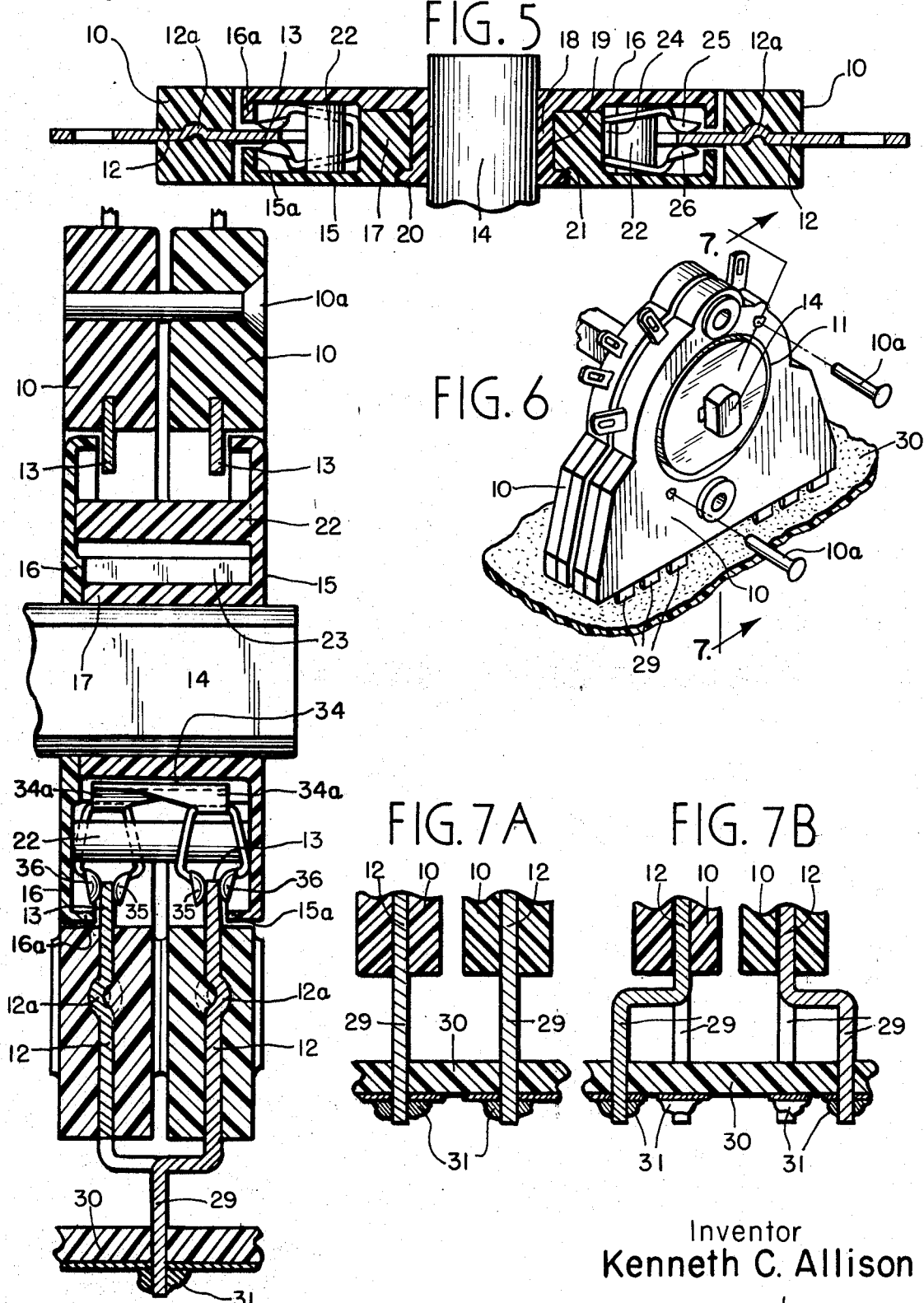

Aug. 25, 1970   K. C. ALLISON   3,525,827
PRINTED CIRCUIT ROTARY SWITCH
Filed May 5, 1969   3 Sheets-Sheet 3
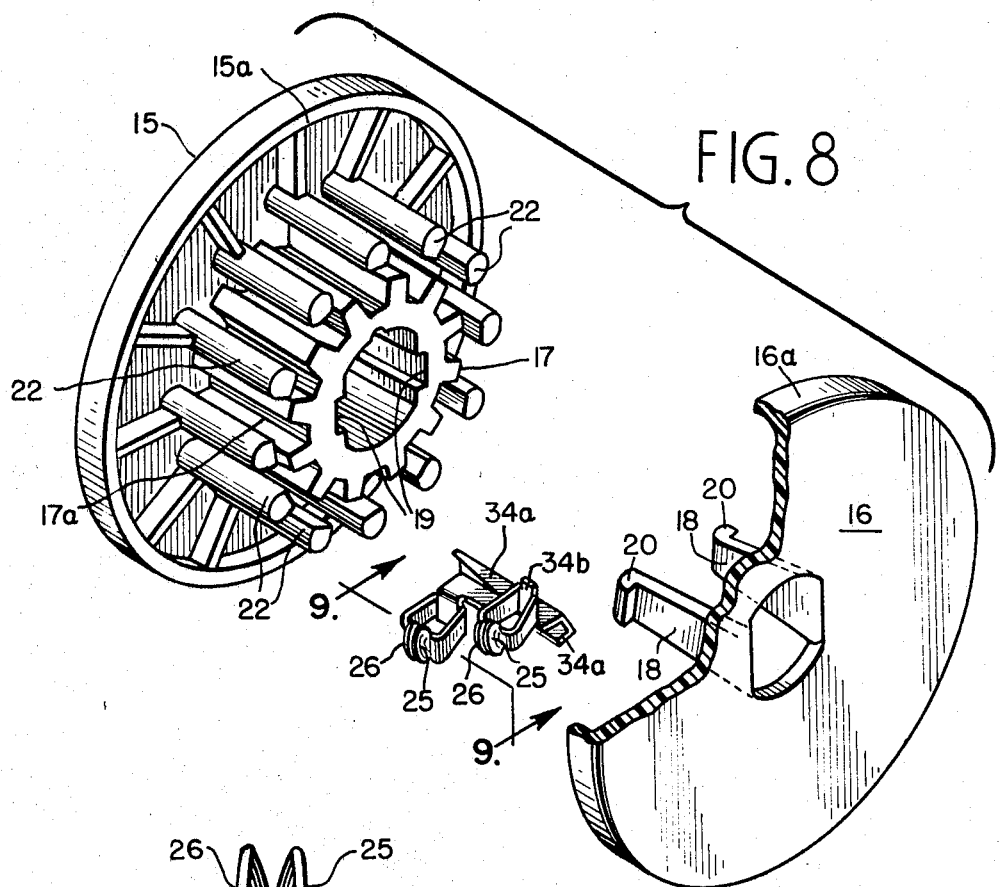
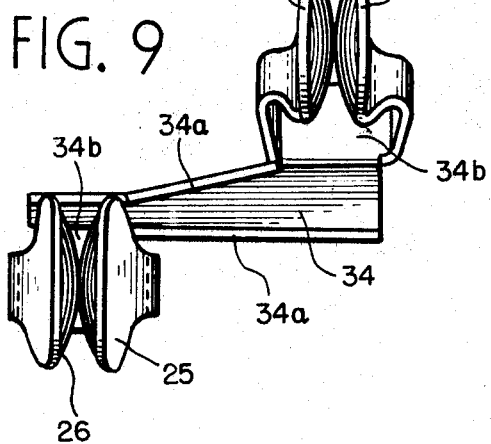
Inventor
Kenneth C. Allison
By *Stanley Hook*
Attorney United States Patent Office 3,525,827
Patented Aug. 25, 1970

3,525,827
PRINTED CIRCUIT ROTARY SWITCH
Kenneth C. Allison, Crystal Lake, Ill., assignor to Kollsman Instrument Corporation, Elmhurst, N.Y., a corporation of New York
Filed May 5, 1969, Ser. No. 831,259
Int. Cl. H01h 19/58
U.S. Cl. 200—11    11 Claims

ABSTRACT OF THE DISCLOSURE

A printed circuit rotary switch wherein an area of the stator unit bordering a segmental portion of the wall of the rotor receiving opening defines a base section having its outer peripheral wall contained in a first plane perpendicular to a second plane containing the axis of rotation of the rotor and conductor strips embedded in said stator throughout the distance between said rotor receiving opening and the outer peripheral wall of said base section have extensions exposed within the area of the rotor receiving opening to define stator contacts which occupy a common plane intermediate opposite faces of the stator unit bordering said rotor receiving opening and also have extensions projecting from said outer peripheral wall of the base section to define printed circuit lugs which occupy spaced apart positions parallel to the intersection of a plane common to said stator contacts and said second plane containing the axis of rotation of the rotor.

---

This invention relates to rotary switches having a stator of molded insulating material and a rotor receiving opening intersecting opposite faces of said stator in which an array of stator contacts are disposed in a common plane in spaced apart relation circumferentially of the wall of the rotor receiving opening for sequential engagement by a rotor contact carried by a rotor having a hub portion with which a shaft has driving connection to establish rotation of said rotor within said rotor receiving opening about an axis centrally of said opening and perpendicular to the plane common to said stator contacts.

More particularly, this invention concerns switches of this type wherein stator contacts along a limited segment of the wall of the rotor receiving opening are defined by the exposed ends of conductor strips embedded in an area of the stator bordering said limited segment of the wall of said opening and exposed ends of said conductor strips extending beyond the outer peripheral wall of the area of the stator containing said conductor strips define terminals for acceptance in openings provided in a printed circuit board.

The printed circuit terminals thus defined by said such exposed ends of the conductor strips along the outer peripheral wall of the stator accordingly occupy positions confined to a plane perpendicular to a selected plane containing the axis of rotation of the rotor. In order to avoid cross-overs among the conductor strips which provide the terminals at either side of said selected plane containing the axis of rotation of the rotor, such strips are shaped to form a first leg extending in radial alignment with the stator contact associated therewith and the portion of the conductor strip connecting said first leg to the terminal of the strip forms a second leg in angularly oriented relation to the first leg. In former switches of this type only the portion of the strip defining said first leg in radial alignment with the stator contact of the strip was confined within the body of the stator so as to conform to the size and annular shape of the stator. As a result, the portion of the conductor strip connecting said first leg to the terminal of the strip was totally exposed and accordingly frequently subjected to deformation in handling for lack of protection by the body of the stator.

In order to overcome this problem, a switch incorporating the features of this invention provides a construction wherein the area of the stator containing the conductor strips which define the printed circuit terminals is extended to produce a base section having its outer peripheral wall along a common plane perpendicular to a selected plane containing the axis of rotation of the rotor, and said conductor strips are embedded in said base section throughout the distance between the wall of the rotor opening and said outer peripheral wall of the base section.

It is also an object of this invention to provide a rotary switch wherein the stator and the stator contacts associated therewith incorporate novel features of design and assembly which not only simplify the production of the switch with resulting cost savings and improved quality but also enhances the versatility of the switch in meeting the demands of an ever widening diversity of switch circuitry patterns.

The foregoing and other objects of the present invention will be understood more clearly from the following detailed description taken in connection with the accompanying drawing, wherein:

FIG. 5 is a sectional view taken along line 5—5 of FIG. 1.

FIG. 6 is a top perspective view of a modified switch assembly in which two switch stators are stacked in axially aligned relationship.

FIG. 7 is a sectional view taken along line 7—7 of FIG. 6.

FIG. 7a and FIG. 7b are similar fragmentary sections illustrating variations in arrangement of printed circuit lugs available in a switch assembly embodying the present invention.

FIG. 8 is an exploded view of the rotor unit shown in the switch assembly illustrated in FIGS. 6 and 7.

FIG. 9 is an enlarged detail view of the rotor contact member shown in FIG. 8.

Referring now particularly to the accompanying drawing, the rotary switch as shown in FIGS. 1 to 5 includes a stator 10 of suitable molded insulating material having a rotor receiving opening 11. Conductor strips 12 embedded in the stator while said strips are integrally joined by the material of a pre-cut blank (not shown) of suitable metallic material, provide stator contacts 13 which are defined by ends or extensions of said strips which are exposed within the confines of the rotor opening 11 after severance of the strips 12 from the pre-cut blank of metal stock, whereby said stator contacts 13 occupy a common plane intermediate the opposite faces of the stator 10 and in spaced apart relation circumferentially of the rotor opening 11.

Figure 2:
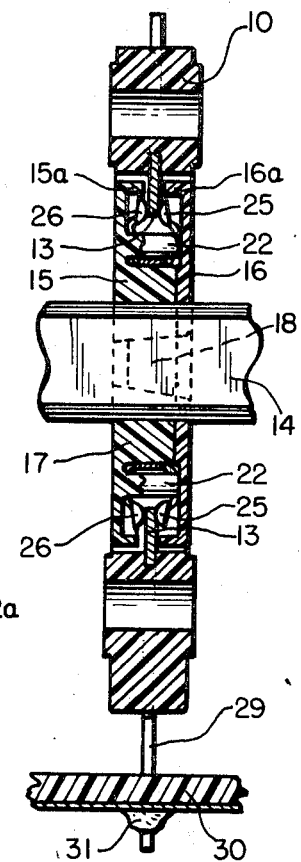
FIG. 2 is a sectional view taken along line 2—2 of FIG. 1.
Figure 3:
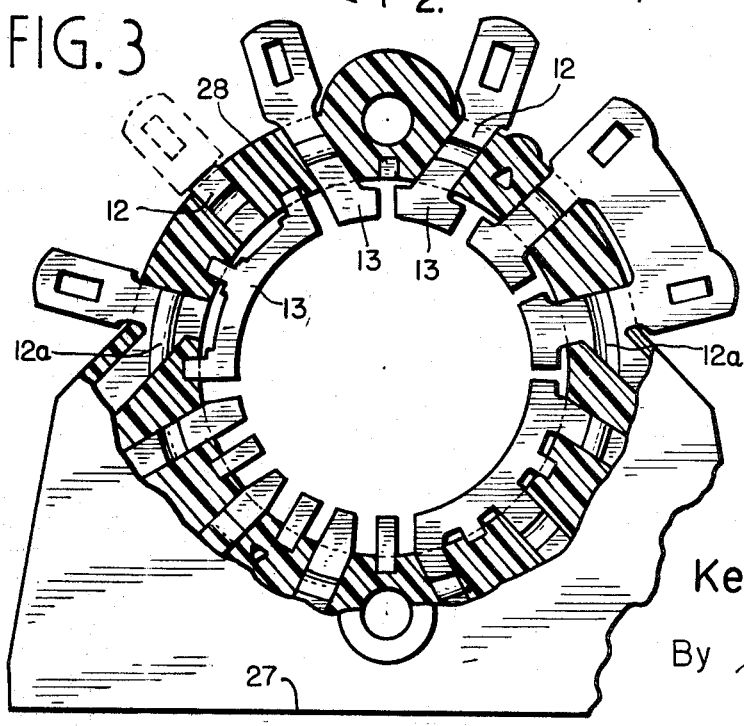
FIG. 3 is a plan view of the switch stator unit shown in FIG. 1 with sections thereof removed to expose portions not shown in FIG. 1.
Figure 4:
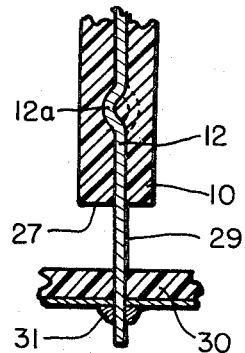
FIG. 4 is a sectional view taken along line 4—4 of FIG. 1.

A rotor unit operable via a drive shaft 14 to rotate within the opening 11 in the stator 10 about an axis centrally of the opening and perpendicular to a plane occupied by said stator contacts 13 includes a first rotor section 15 and a second rotor section 16. Each section 15 and 16 is formed of suitable insulating material. As illustrated in FIGS. 2 and 5 of the drawing, rotor section 15 is provided with a hub portion 17 in axially extending relation to the area of the section 15 in radially outlying relation to said hub portion. Means for joining rotor section 16 to the hub portion 17 of rotor section 15 so as to establish a rigid axially aligned assembly includes a pair of coupling fingers 18 defined by axial extensions of the rotor section 16 along opposite edge portions of the opening in which the shaft 14 has driving fit with the rotor section 16. Pockets 19 are formed in opposite wall portions of the opening in which the shaft 14 has driving fit with the hub 17 of the rotor section 15 so as to position said pockets 19 in axial aligned relation with the fingers 18 and thereby said fingers are received in and have interfitting engagement with said pockets 19. When thus fitted in the pockets 19 of the hub 17 of rotor section 15, a tab 20 at the terminal of each finger 18 has overlapping engagement with surfaces 21 of the hub 17 which face axially away from the rotor section 16 to prevent axial separation of the rotor sections 15 and 16. It should also be noted that the surface of the shaft 14 and the surface of the fingers 18 facing the shaft have such interfitting engagement as to prevent withdrawal of the tabs 20 from interlocked engagement with the surface 21 of the hub 17 opposite thereto. When the rotor sections 15 and 16 are thereby joined in rigid assembly, the areas of the rotor sections extending radially away from the hub portion 17 are spaced apart axially of the hub 17 to form an annular slot through which the stator contacts 13 have access to the area between the rotor sections 15 and 16.

Figure 1:
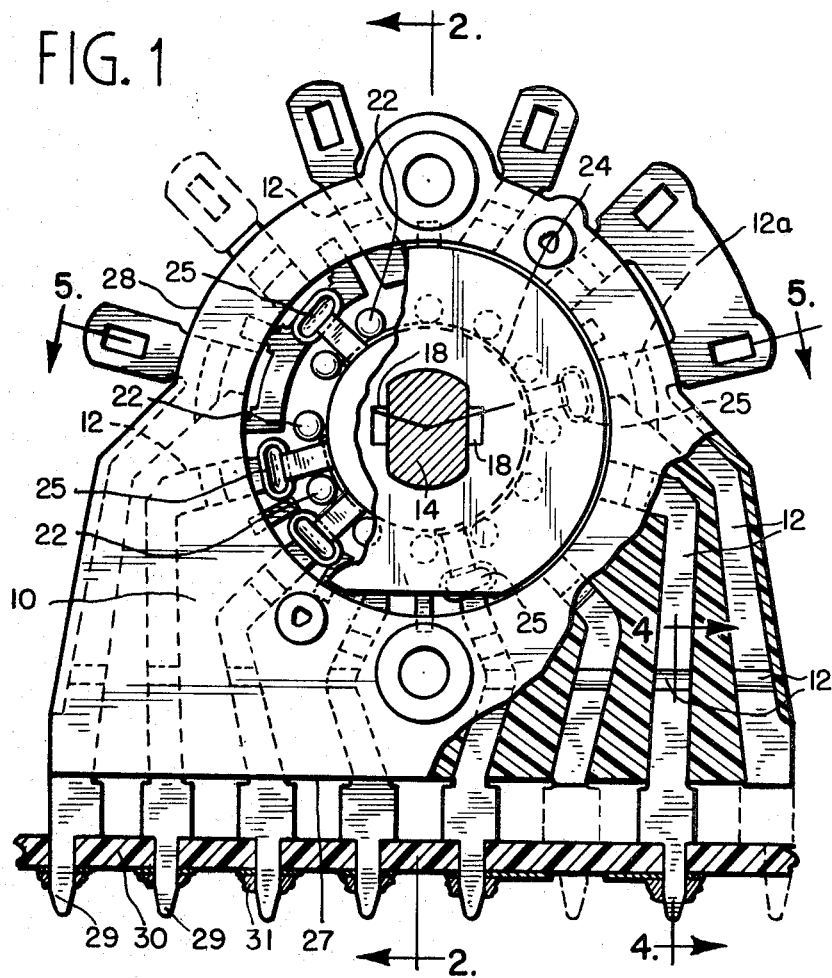
FIG. 1 is a plan view of a rotary switch representing one embodiment of the present invention.

Reference numeral 22 designates cylindrical axial extensions or division members formed integrally with the rotor section 15 between the area occupied by the stator contacts 13 and the hub portion 17 of rotor section 15. The division members 22 are uniformly spaced apart circumferentially of a circle concentric with the hub portion 17 and each member 22 substantially spans the distance between the rotor sections 15 and 16. The surface of the hub portion 17 and the surface of the division members opposite thereto cooperate to form an annular clearway 23 therebetween, while the space between each neighboring pair of division members 22 provides a radial clearway between said annular clearway 23 and the area occupied by the stator contacts 13. A curved conductor strip 24, as shown in FIG. 1, is confined in said annular clearway 23 while radially outwardly extending branches formed integrally with said strip 24 occupy positions in alignment with selected radial clears between said division members 22. Each of said branches of the strip define a pair of resilient axially opposed contact jaws 25 and 26 which have sliding engagement with the stator contacts 13 as the rotor sections 15 and 16 are turned by the shaft 14. It will be observed that the conductor strip 24 is of such dimension measured circumferentially of the clearway 23 as to link the contact jaws 25 and 26 at one end of the strip 24 and the contact jaws 25 and 26 at the other end of the strip 24 at a distance apart in excess of 180 degrees along an arc concentric with the axis of rotation of the rotor while the contact jaws 25 and 26 intermediate said end portions of the strip 24 occupy a position at a distance away from said contact jaws 25 and 26 at the ends of the strip not less than 90 degrees along said arc.

Accordingly, a first stator contact 13 and a second stator contact occupying circumferentially spaced apart positions in excess of 90 degrees along the path of rotation of the rotor contacts 25 and 26 may be simultaneously electrically connected via the conductor strip 24 and the axially opposed contact jaws 25 and 26 defined by the branches formed integrally with said conductor strip.

A rim 15a along the edge of the rotor section 15 facing the wall of the opening 11 in the stator 10 and a similar rim 16a along the corresponding edge of the rotor section 16 have engagement with the area of the stator contacts 13 between said wall of the opening 11 and that portion of the stator contacts 13 overlapped by the rotor contact jaws 25 and 26 to restrict axial movement of the rotor sections 15 and 16 relative to the stator. While the conductor ring 24 is trapped against withdrawal from the clearway in directions radially as well as axially of the rotor section 15, it is to be noted that a slight freedom of movement is available so as to permit sufficient shifting of the rotor contact jaws 25 and 26 to accommodate slight variances in the alignment of the stator contacts 13 relative to the path of movement of such contact jaws incident to rotation of the rotor.

As shown in FIG. 1, the stator 10 includes an area bordering a segmental portion of the wall of the rotor opening 11 which defines a base section terminating in an outer peripheral wall 27 which is contained in a first plane perpendicular to a second plane containing the axis of rotation of the rotor sections 15 and 16. The area of the stator 10 bordering said opening 11 except for said base section defines a second section having a major part of its outer peripheral wall 28 conforming to the arc of a circle concentric with the path of rotation of said rotor and extending equidistantly in opposite directions from said second plane containing the axis of rotation of the rotor unit toward said base section. Conductor strips 12 which occupy the area of the base section of the stator and extend the full distance between the rotor receiving opening 11 and the outer peripheral wall 27 have extensions which project from the wall 27 to define printed circuit lugs 29 which occupy positions in spaced apart relation parallel to the intersection of a plane containing the stator contacts 13 and said second plane containing the axis of rotation of the rotor and perpendicular to the wall 27 of the stator base section. Accordingly the lugs 29 provide terminals for insertion in the holes of a printed circuit board 30 whereby said terminals may be joined to the circuit on the board via a soldered connection 31 as shown in FIG. 1.

The strips 12 embedded in the base section of the stator each have an arched section 12a with the arched section 12a of each strip 12 occupling reversed positions relative to the corresponding arched section of the conductor strips 12 flanking said strip whereby said arched sections cooperate to produce a series of semi-cylindrical segments of a tunnel-like shape along a continuous course at a uniform distance inwardly from the wall 27 of the base section of the stator. The strips 12 embedded in the second section of the stator likewise have corresponding arched sections 12a along a course at a uniform distance inwardly from the outer peripheral wall 28 of said second section of the stator. During the operation of molding the stator, the flow of the molding material and fibers of reinforcing elements in the molding material along the course occupied by said sections 12a is thus facilitated so as to thereby cause the strips 12 to be linked by and interlocked with a rod like structure of molding material in conformity with the route of flow established by said arched sections 12a. Such interconnection of the strips 12 via the reinforced area thus provided by the molding material in conjunction with said arched sections 12a adds substantially to the security of the embedded positions of the strips 12 in the sections of the stator containing said strips.

In certain types of printed circuit installations, it is desirable to provide a multi-section stator unit as shown in FIGS. 6 and 7 wherein first and second stators 10 (like stator 10 shown in FIGS. 1 to 5 are joined in stacked axially aligned relation. In such multi-section units, the stators 10 are joined in fixed relation by suitable fastening means such, for example, as pins 10a preferably of non-conductive material which register with aligned openings in the stators 10 with exposed ends which are subjected to heat and pressure to form anchoring heads at the exposed face portions of the stators 10 bordering said aligned openings containing said pins. Accordingly, as viewed in FIG. 7, the stators 10 combine to form a first series of stator contacts 13 in a first plane intermediate the exposed faces of the stators 10 and a second series of stator contacts 13 in a second plane intermediate said exposed faces of the stators 10 and in axially spaced parallel relation to the series of stator contacts in the first plane.

In a multi-section switch unit as shown in FIGS. 6 and 7, a rotor unit is employed having a rotor section 15 and 16 like that used in the single stator unit switch shown in FIGS. 1 to 5, except that the axial dimension increased to conform to the corresponding axial dimension of the switch as established by the stacked stator sections 10. This is accomplished by means of a rotor section 15 having its clearway 23 defined by an axially extended hub portion 17 and a correspondingly lengthened series of division members 22, as shown in FIG. 8, and by likewise increasing the length of the coupling fingers 18 of rotor section 16. In rotor section 15 of the multi-section switch unit shown in FIGS. 6 and 7, indentations are provided in the hub portion 17 to form axially extending recesses 17a in radially opposed relation to the division members 22.

In connection with a switch assembly having a pair of axially aligned stators 10 as illustrated in FIGS. 6 and 7, an electrical circuit is established between contacts 13 of each stator 10 by means of a rotor contact member, as shown in detail in FIG. 7 and FIG. 8, as well as FIG. 9, having a conductor strip 34 which is confined within and extends axially of a selected recess 17a of the rotor hub of rotor section 15. Referring more particularly to FIG. 9, it will be further noted that the strip 34 is bent upon itself along an axially extending fold line to form first and second like wings 34a which diverge uniformly radially outwardly from said fold line for interengagement with the surfaces of the recess 17a facing said wings 34a and the fold line joining said wings. Each wing includes an integral branch extending circumferentially away from the area between said wings with the branch of the first wing 34a positioned diagonally opposite the branch of the second wing 34a relative to a rectangular area bordered along a pair of opposite sides thereof parallel to and equidistantly straddling said fold line. Each branch thus extending from the wings of said conductor strip provides a pair of like fingers and an intervening web 34b to which said fingers are joined to define a pair of axially opposed contact jaws 35 and 36. The branches of the wings of the conductor strip which define said pairs of axially opposed contact jaws 35 and 36 accordingly flank a division member 22 radially opposite the recess 17a of the rotor hub containing the strip 34. The division members 22 which are directly opposite the recesses 17a containing the conductor strip 34 provide surfaces engageable with radially extending edges of the contact jaws facing away from the division member 22 flanked by said contact jaws to establish the confines of the area occupied by the contact jaws which in conjunction with the interfitting relationship between the wings 34a of the conductor strip 34 and recess 17a in which said wings 34a are nested provide an interconnection between the rotor section 15 and the rotor contact member which effects movement of the contact jaws 35 and 36 of the rotor contact member along paths defined by the stator contacts 13 sequentially engaged by said contact jaws in response to rotation of the rotor sections 15 and 16 under control of the operating shaft 14. It is to be noted, however, that such interconnection between the rotor contact member and the rotor section 15 also allows the rotor contact member a degree of freedom to tilt relative to the rotor hub about axes extending radially of the rotor hub and thereby accommodate relative adjustment of the jaws 25 and 26 of the contact member in relation to the stator contacts when such adjustment is needed to compensate for slight variations in axial spacing between the rows of stator contacts 13. The webs 34b terminate in circumferentially outwardly extending ears and the division members 22 opposite the recesses which flank the recess 17a occupied by the wings 34a of the strip 34 have surfaces facing the hub 17 with which said ears have engagement to restrict movement of the rotor contact member radially outwardly of the area operatively occupied by the strip 34 wherein said wings 34a of the rotor contact member have interengagement with the recess 17a associated therewith.

As shown in FIGS. 7b and 7a, the lugs 29 of each stator 10 of the multi-stator assembly illustrated in FIG. 7 may be arranged to occupy a single plane or they may be bent to occupy two or more separate planes according to the desired relationship of the lugs 29 and the holes of the printed circuit board with which said lugs 29 are operatively associated.

When formed of brass stock, the contacts 13 and the lugs 29 forming exposed extensions of the conductor strips 12 are coated with a layer of silver plate so as to provide a finish suitable for most normal low power installations. In accordance with the present invention, the plating operation is performed after the molded stator 10 has been applied to the pre-cut blank of metal stock and after the areas of the blank defining said contacts 13 and the lugs 29 have been separated from the blank. Thus all exposed edges of the contacts 13 and the lugs 29 including the edges produced as an incident to said operation of severance from the blank are completely protected by said coating of silver plating.

What is claimed is:

1. A printed circuit rotary switch including a stator of molded insulating material, a rotor receiving opening intersecting opposite faces of said stator, stator contacts occupying fixed coplanar positions within the confines of said opening intermediate said faces of the stator and spaced apart circumferentially of said opening, a rotor having a hub portion with which a shaft has driving connection to establish rotation of said rotor within said opening about an axis centrally of said opening and perpendicular to a plane containing said stator contacts, a rotor contact supported on said rotor for sequential engagement with said stator contacts incident to rotation of said rotor, said stator having a base section bordering a first segmental portion of the wall of said rotor opening with an outer peripheral wall thereof contained in a first plane perpendicular to a second plane containing the axis of rotation of the rotor, and a second section of said stator bordering the wall of the rotor opening except for said segmental portion bordered by said base section, said second section of the stator having the major part of its outer peripheral wall conforming to the arc of a circle concentric with the path of rotation of said rotor and extending equidistantly in opposite directions from said second plane toward said base section, said stator contacts occupying the area of the rotor opening bordered by said second section being defined by extensions of conductor strips embedded in said second section, said stator contacts occupying the area of the rotor opening bordered by said base section being defined by extensions of conductor strips embedded in said base section throughout the distance between said rotor opening and said outer peripheral wall of said base section, and printed circuit lugs projecting from said outer peripheral wall of said base section defined by extensions of said conductor strips embedded in said base section and occupying spaced apart positions parallel to the intersection of a plane common to said stator contacts and said second plane containing the axis of rotation of the rotor.

2. A printed circuit rotary switch according to claim 1 wherein said stator and a like second stator are rigidly joined in axially aligned relation to provide a stator unit wherein the stator contacts occupy axially spaced apart first and second planes and wherein the rotor contact includes a first pair of axially opposed jaws engageable with stator contacts in said first plane and a second pair of axially opposed jaws engageable with stator contacts in said second plane, and a conductor strip extending axially of the hub of said rotor is provided with integral branches defining said first and second pairs of axially opposed jaws.

3. A printed circuit rotary switch according to claim 2 wherein said second pair of axially opposed jaws is offset from said first pair of axially opposed jaws circumferentially of said rotor opening.

4. A printed circuit rotary switch according to claim 1 wherein the dimension of the base section measured along said outer peripheral wall is coextensive with the dimension of the stator measured along a line parallel to said outer peripheral wall of the base section and drawn diametrically of the rotor receiving opening in said stator.

5. A printed circuit rotary switch according to claim 1 wherein said rotor includes first and second sections, and said shaft has driving connection with said rotor via an opening in a hub portion defined by an axial extension of said first section and an opening in said second section, and means joining said sections in rigid assembly is defined by self contained interlocked fastening means.

6. A printed circuit rotary switch according to claim 5 wherein areas of said rotor sections in radially outlaying relation to said hub portion are separated by an axially extending space in which said stator contacts have access to the area between said rotor sections.

7. A printed circuit rotary switch according to claim 5 wherein said self contained fastening means include coupling fingers defined by axial extensions of said second rotor section along opposite edge portions of the shaft receiving opening in said second rotor section, pockets formed in opposite wall portions of the shaft receiving opening in the hub portion of said first rotor section with which said coupling fingers are axially aligned for reception in said pockets, each of said fingers terminating in a tab having overlapping engagement with surfaces of the first rotor section bordering said pockets and facing away from the second rotor section to prevent axial separation of said first and second rotor sections, and each of said fingers having engagement with the shaft in said shaft receiving openings in said rotor sections to prevent radial withdrawal of said fingers from said pockets.

8. A rotary switch having a stator of molded insulating material, a rotor receiving opening intersecting opposite faces of said stator, stator contacts occupying fixed coplanar positions within the confines of said opening intermediate said faces of the stator and spaced apart circumferentially of said opening, a rotor having a hub portion with which a shaft has driving connection to establish rotation of said rotor within said opening about an axis centrally of said opening and perpendicular to a plane containing said stator contacts, a rotor contact supported on said rotor for sequential engagement with said stator contacts incident to rotation of said rotor, said stator contacts being defined by extensions of conductor strips embedded in said stator incident to the molding of the stator, said embedded connector strips each having an arched section with the arched section of alternate conductor strips occupying reversed positions to thereby cooperate in forming a series of semi-cylindrical segments of a tunnel-like shape along a line extending circumferentially of the rotor opening in the stator and thus cause said embedded conductor strips in the stator to become linked by and interlocked with an endless rod-like reinforced area of insulating material conforming to the circular course established by said arched sections.

9. A printed circuit rotary switch according to claim 1 wherein the rotor is provided with an annular clearway concentric with the axis of rotation of the rotor radially inwardly of the area occupied by said stator contacts, and said rotor contact includes a first pair of axially opposed jaws and a second pair of axially opposed jaws defined by integral branches of a conductor strip mounted in said clearway, and said first pair of said jaws and said second pair of said jaws are thereby spaced apart a distance of not less than 90 degrees circumferentially of said clearway.

10. A printed circuit rotary switch according to claim 9 wherein said annular clearway is defined by the surface of said rotor hub facing the area occupied by said stator contacts and a series of axially extending division members formed integrally with the rotor occupying uniformly spaced apart positions circumferentially of said rotor hub, and each of said branches of said conductor strip is flanked by a pair of neighboring division members.

11. In the manufacture of a rotary switch stator unit of molded insulating material having a rotor receiving opening, and conductor strips embedded in said stator, said strips having extensions thereof exposed within said opening to define coplanar stator contacts and having extensions defining exposed portions along the outer periphery of said stator, the method which comprises forming in a flat blank of conductive material a group of perforations within a selected area of said blank conductor strips having extensions at opposite ends thereof joined by integral bridging portions, casting a body of insulating material around said strips within an area bordered by said bridging portions, cutting away the bridging portions to separate said extensions and thereafter subjecting said extensions to a plating operation.

References Cited

UNITED STATES PATENTS

| | | |
|---|---|---|
| 2,988,607 | 6/1961 | Tabet. |
| 2,971,066 | 2/1961 | Tabet. |
| 3,089,923 | 5/1963 | Wright. |

FOREIGN PATENTS

| | | |
|---|---|---|
| 705,538 | 3/1965 | Canada. |
| 739,557 | 7/1966 | Canada. |

ROBERT K. SCHAEFER, Primary Examiner

J. R. SCOTT, Assistant Examiner

U.S. Cl. X.R.

200—168